US006429883B1

(12) United States Patent
Plow et al.

(10) Patent No.: US 6,429,883 B1
(45) Date of Patent: Aug. 6, 2002

(54) METHOD FOR VIEWING HIDDEN ENTITIES BY VARYING WINDOW OR GRAPHIC OBJECT TRANSPARENCY

(75) Inventors: Gregory Maurice Plow, Gilroy; Farrokh E. Pourmirzaie, San Jose, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/390,045

(22) Filed: Sep. 3, 1999

(51) Int. Cl.[7] .................................................. G06F 3/14
(52) U.S. Cl. ........................................ 345/768; 345/797
(58) Field of Search ................................ 345/764, 767, 345/768, 778, 781, 788, 790, 794, 797, 802, 803, 835, 840, 619, 629, 637

(56) References Cited

U.S. PATENT DOCUMENTS

| | | | | |
|---|---|---|---|---|
| 5,283,560 A | * | 2/1994 | Bartlett ........................ | 345/729 |
| 5,651,107 A | * | 7/1997 | Frank et al. ................. | 345/768 |
| 5,805,163 A | * | 9/1998 | Bagnas ........................ | 345/768 |
| 5,999,191 A | * | 12/1999 | Frank et al. ................. | 345/634 |
| 6,072,489 A | * | 6/2000 | Gough et al. ............... | 345/803 |

* cited by examiner

Primary Examiner—Crescelle N dela Torre
(74) Attorney, Agent, or Firm—Sawyer Law Group LLP

(57) ABSTRACT

The present invention provides a method and system for viewing the contents of an application window that would otherwise be hidden. The method and system comprise displaying a plurality of application windows. The first application window of the plurality of application windows is the primary application window and a portion of another application window is being obscured by the primary application window. The method and system displays the primary application window at a variable degree of transparency based upon a user interaction. Through the use of the present invention a user can simultaneously view information from multiple applications where one or more windows are partially or wholly covering needed information in an underlying application. This will provide the user with the ability to quickly access needed information without having to undergo the time consuming process of resizing or rearranging desktop window configurations.

30 Claims, 7 Drawing Sheets

METHOD FOR VIEWING HIDDEN ENTITIES BY VARYING WINDOW OR GRAPHIC OBJECT TRANSPARENCY

FIELD OF INVENTION

The present invention relates generally to a system and method for the use of an application tool to facilitate the viewing of normally hidden information in a multiple application window environment.

BACKGROUND OF THE INVENTION

A windows type desktop such as IBM OS2 or MicroSoft Windows provides the user with substantial flexibility in managing the look of the desktop while interfacing with applications. Functions are provided that enable the desktop user to size application windows, move application windows, overlay application windows and to reduce application windows to icons. An application icon provides only the identification of the deployed application with no other information related to the application visible on the desktop. FIG. 1 illustrates an example of a conventional display screen 25 containing desktop icons 15, an application window 20, a minimize button 10, a window reduction/enlargement button 12, a close button 14, an application title bar 16, an application tool bar 18, and scroll bars 22, 24. Application icons 28 are located in the taskbar 26.

Over the years, more and more applications are typically available for activation from the desktop. Generally users are also deploying an increasing number of applications that are concurrently in some state of execution. As this trend continues, even more flexibility for managing the desktop is needed to provide the user with the best productivity from her desktop system. More particularly, when information from two different application windows is needed, the desktop user is forced into one of several methods which can be time consuming and detrimental to her productivity. One such method involves reducing one or more applications to an icon such that the underlying application and information may be viewed. Another method involves selecting the icon representing the application (or selecting a portion of the application window if not completely covered) that contains the needed information as a means to bring that application window to the top of the desktop.

One problem with these methods is that they do not facilitate the viewing of information from multiple application windows concurrently. This problem becomes evident when dealing with overlapping application windows. FIG. 2 is illustrative of a situation involving a primary application window 30 and an overlapped application window 40. When there is a need for the simultaneous viewing of information contained in the windows 30, 40, the user must resize the corresponding application windows and arrange them on the desktop so as to make both sets of needed information simultaneously viewable. After viewing the needed information, the user typically resizes the application windows 30, 40 back to their original size to facilitate the easy viewing of each application windows without causing undue eyestrain. When all the user wants is a quick look at some information in one application for comparison or manipulation in the other application, the conventional methodology is a time consuming and annoying procedure.

Conventional methods exist where the user can cause the background of an application window to become transparent, however these methods lack the useful capability of varying the degree of transparency. Varying the degree of transparency facilitates keeping the "look and feel" of the primary application while still allowing the underlying information to show through to a degree necessary for legibility. Varying the degree of transparency allows the user to distinguish information from the primary application with the information from the underlying window.

What is needed is a method for viewing the contents of an application window that would otherwise be hidden. This will provide the user with the ability to quickly access needed information without having to undergo the time consuming process of resizing or rearranging desktop window configurations.

SUMMARY OF THE INVENTION

The present invention provides a method and system for viewing the contents of an application window that would otherwise be hidden. The method and system comprise displaying a plurality of application windows. The first application window of the plurality of application windows is the primary application window and a portion of another application window is being obscured by the primary application window. The method and system displays the primary application window at a variable degree of transparency based upon a user interaction.

Through the use of the present invention a user can simultaneously view information from multiple applications where one or more windows are partially or wholly covering needed information in an underlying application. This will provide the user with the ability to quickly access needed information without having to undergo the time consuming process of resizing or rearranging desktop window configurations.

DETAILED DESCRIPTION OF THE INVENTION

The present invention provides a method and system for viewing previously hidden application windows. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

A method and system in accordance with the present invention is disclosed in the context of a preferred embodiment. The present invention allows for a very fast method for simultaneously viewing information from multiple applications where the primary window is partially or wholly covering the needed information in a window directly beneath the primary window. This will provide the user with the ability to quickly access needed information without having to undergo the time consuming process of resizing or rearranging desktop window configurations.

Figure 1:
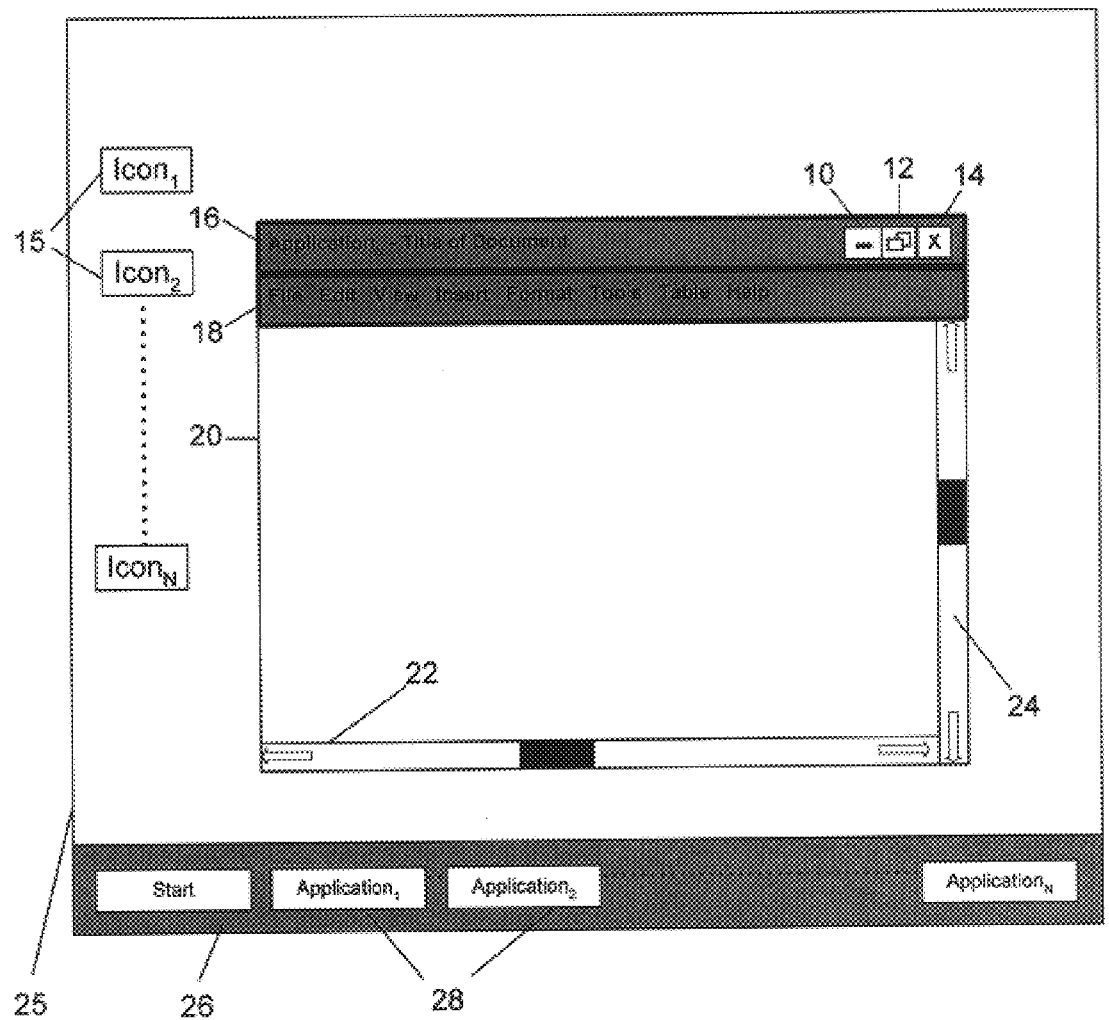
FIG. 1 shows a conventional application window configuration.
Figure 2:
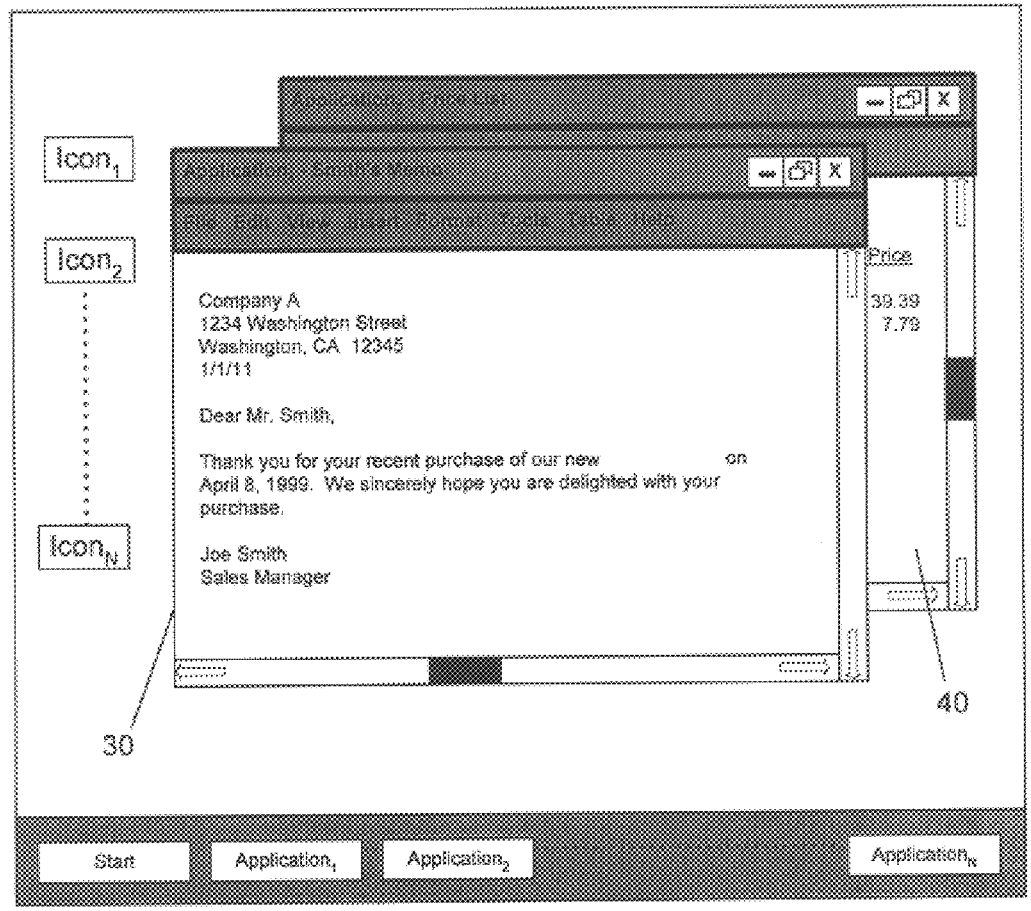
FIG. 2 shows conventional overlapping application windows.
Figure 3:
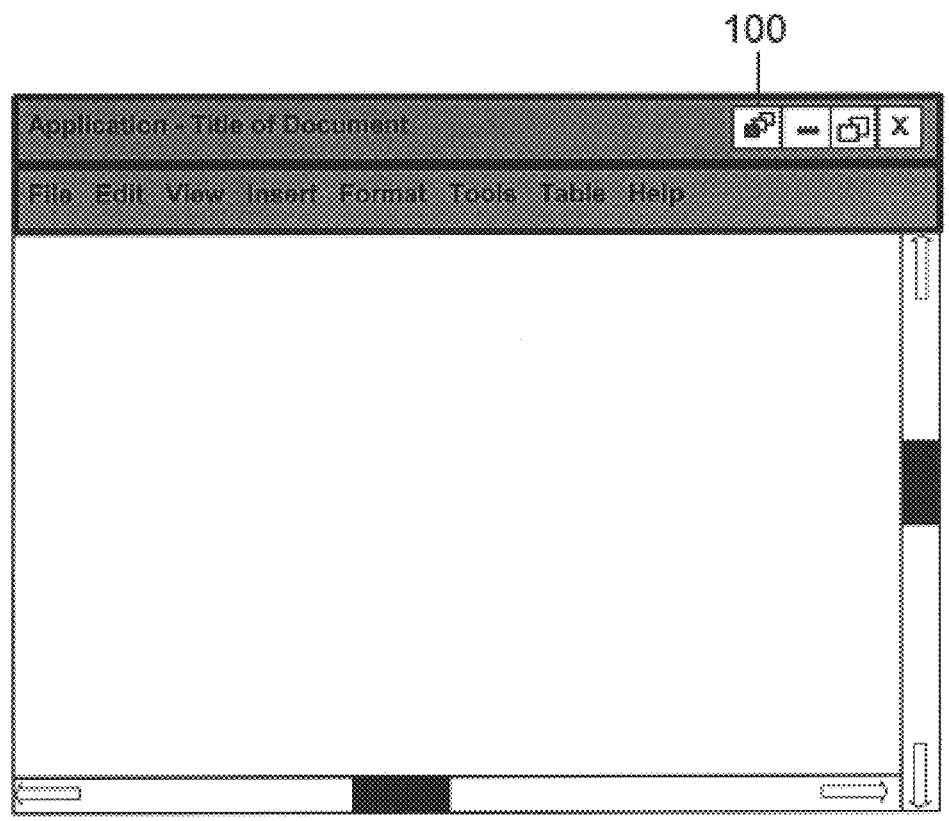
FIG. 3 is a diagram of an application window in accordance with the present invention.

Referring now to FIG. 3, the method and system in accordance with the present invention is described in the context of a preferred embodiment. This embodiment provides for the implementation of a transparency button 100 in the application window which when "clicked" causes the background of the application window to become transparent to a variable extent. For example, the background could become fully transparent or varying degrees of transparency could be achieved by "clicking and holding" on the button with the "click release" coming coincident with the desired degree of transparency of the background. A subsequent "click" of the same button could return the background to its original opaque character. Although the implementation of a button is preferable, one of ordinary skill in the art will readily recognize that various types of user interactions could be implemented while remaining within the spirit and scope of the present invention.

Figure 4:
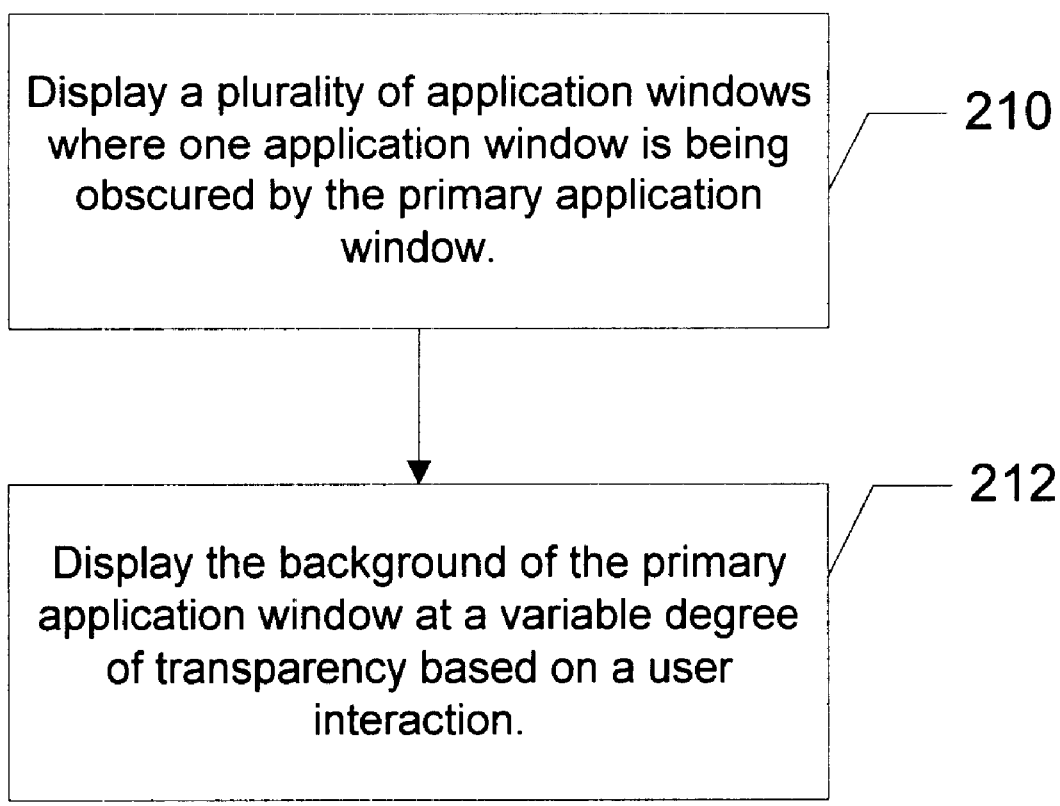
FIG. 4 is a high-level flowchart of a method in accordance with the present invention.

To further understand the operation of the method in accordance with the preferred embodiment of the present invention, refer to FIGS. 4–7. FIG. 4 is a high-level flowchart of the method in accordance with the preferred embodiment of the present invention. A plurality of application windows are displayed where at least one application window is being obscured by the primary application window, via step 210. Next, the background of the primary application window is displayed at a variable degree of transparency based on a user interaction, via step 212.

Figure 5:
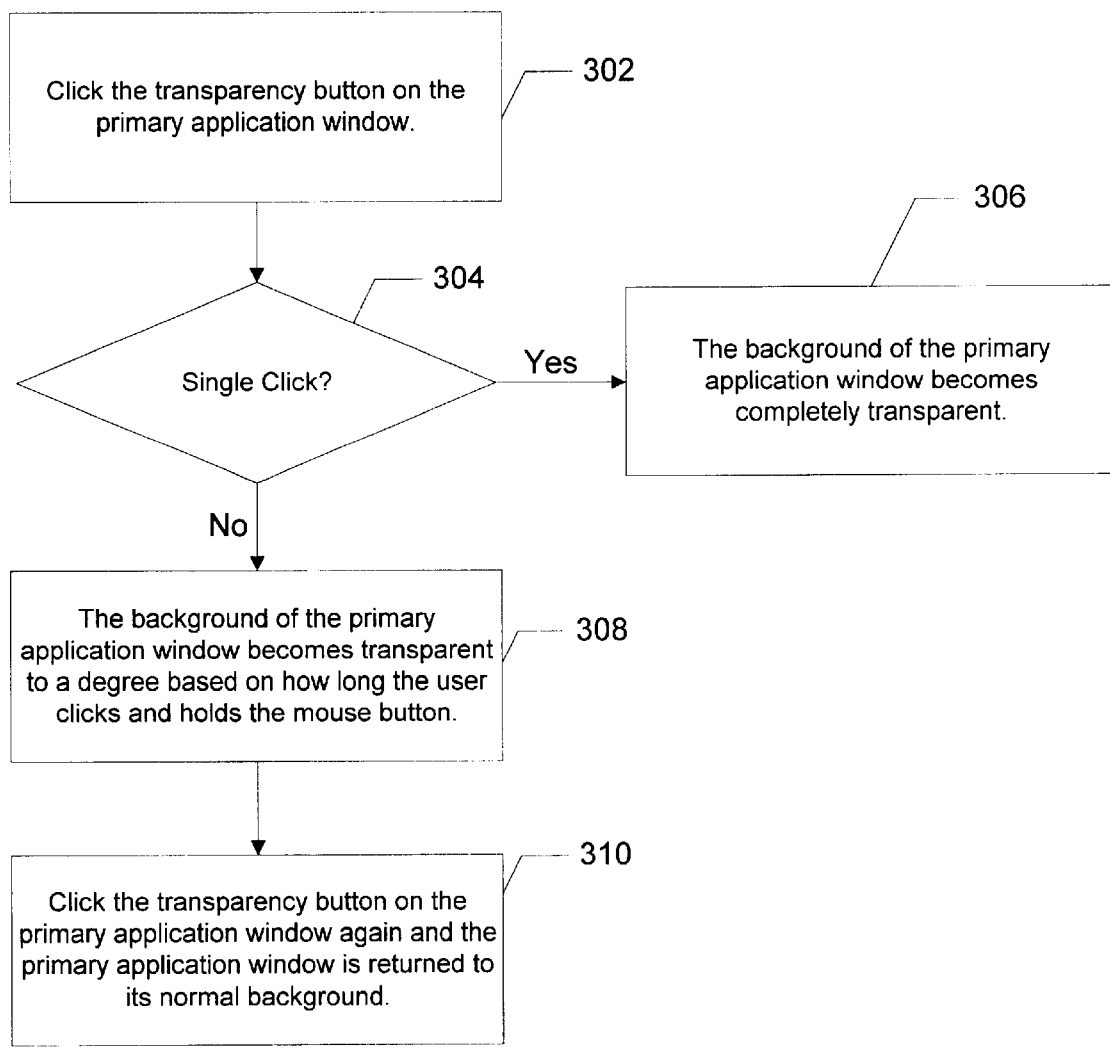
FIG. 5 is a detailed flowchart of the method in accordance with the present invention.
Figure 6:
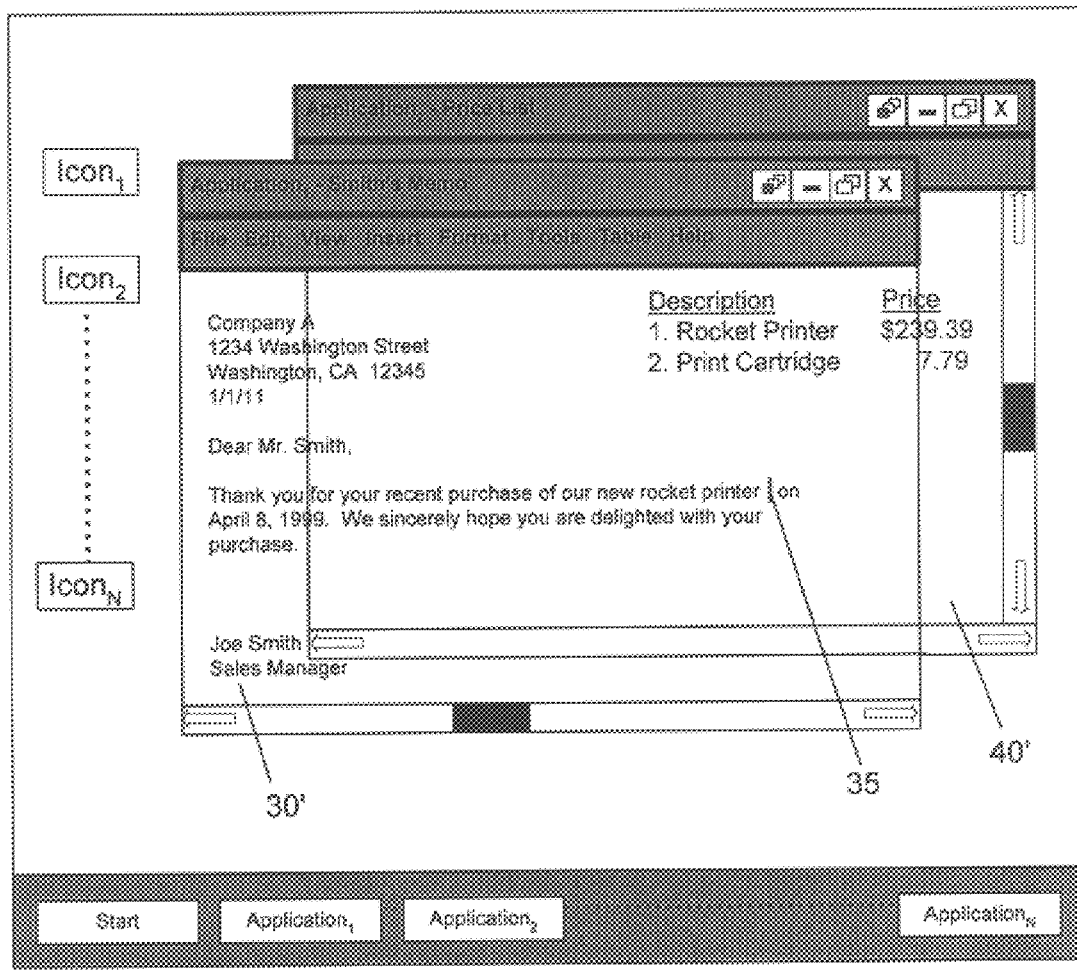
FIG. 6 shows a transparent primary application window overlapping the application window directly underneath it.

For a more detailed description of the method in accordance with the present invention, refer now to FIG. 5. Once a user decides to view a portion of an application directly beneath the primary application window, the user clicks the transparency button on the primary application window, via step 302. It is then determined whether the user utilizes a single click, via step 304. If the user utilizes a single click, the background of the primary application window becomes completely transparent, via step 306 to allow a portion of the window 40 directly beneath the primary application window 30' to be viewed by the user. FIG. 6 depicts a primary application window 30' which has been made completely transparent using step 306. This allows the contents of the window 40 directly beneath the first window 30' to be viewed. The cursor 35 is shown to indicate that the term "rocket printer" was typed in by the user after having located the term by utilizing the present invention.

Figure 7:
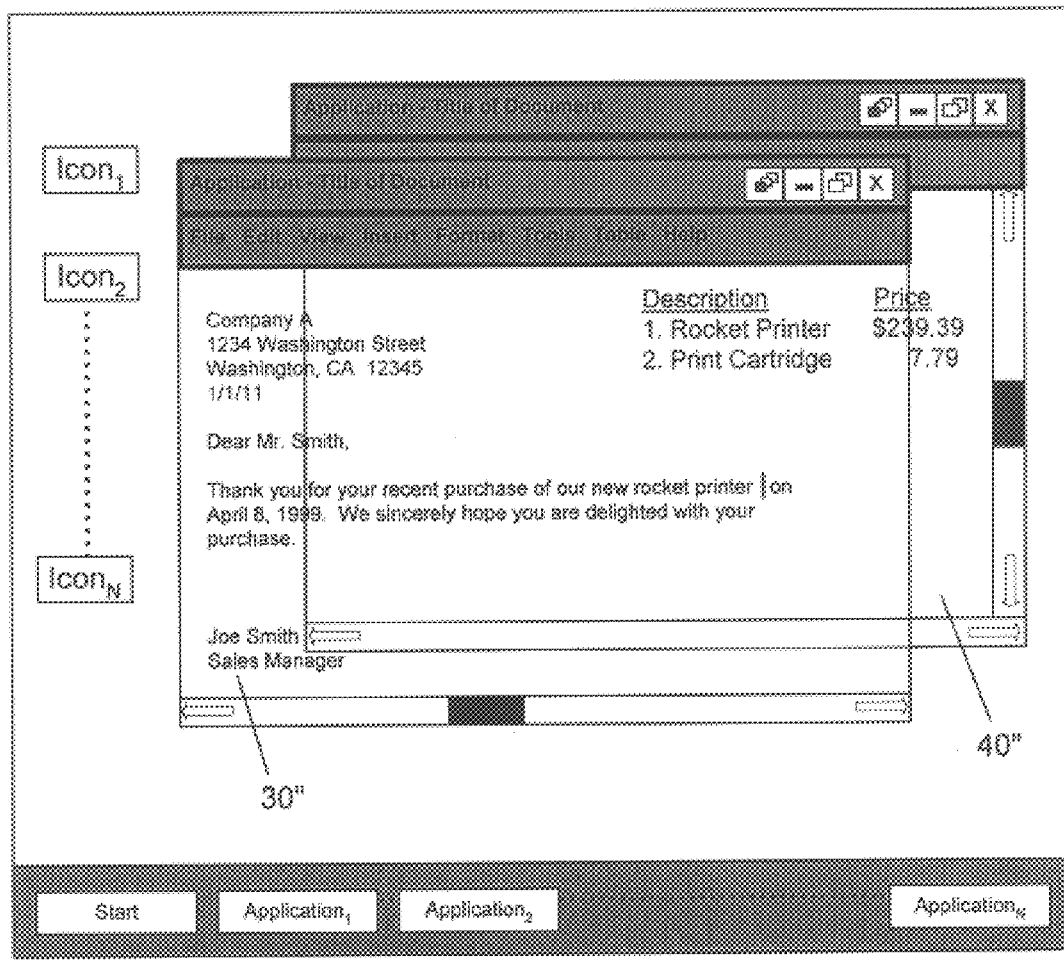
FIG. 7 shows a semi-transparent primary application window overlapping the application window directly underneath it.

Referring back to FIG. 5, if a single click is not utilized, the user has clicked and held the transparency button and the background of the primary application window becomes semi-transparent to a degree that is based on how long the user holds the transparency button, via step 308. FIG. 7 depicts a primary application window 30" which has been made semi-transparent. Again, this allows the contents of the window 40 directly beneath the first window 30" to be viewed. Referring back to FIG. 5, when the user is finished viewing the underlying application, the user clicks the transparency button on the primary application window again and the primary application window is returned to its normal background, via step 310.

This is a very fast technique for the "quick look" of underlying information that is so often needed. In addition this technique works best for situations where the background of the primary application window comprises the a significant portion of the window and where the information is sparsely spread about. Consequently, there are numerous popular applications where this feature would provide the method of first choice for simultaneously viewing information from overlapping windows.

Another aspect of this embodiment can enhance today's common "cut" and paste" operations. Whenever the background of an application window is transparent, a "cut" operation on the underlying information would be permissible, without having to disturb interaction with the primary application window. Prior to the "paste" operation, the user merely "re-clicks" the transparency button, returning the primary application window to normal operation mode.

It will be apparent to those skilled in the art that the disclosed method of variable transparency can be utilized to vary the transparency of a selected graphic object on display. Once a graphic object has been selected, a transparency button on the application tool bar can be clicked once for complete transparency of the object fill, retaining only the object outline. In addition, the transparency button, as previously discussed, can be depressed and held. This results in the graphic object becoming increasingly more transparent until the desired degree of transparency is achieved, at which time the user releases the transparency button to cease the variation of transparency. Clicking the transparency button once again returns the graphic object to the opaque state.

The system and method in accordance with the present invention allows the user to view the contents of application windows that would otherwise be hidden. Through the use of the present invention a user can simultaneously view information from multiple applications where the primary application window is partially or wholly covering needed information in an underlying window. This will provide the user with the ability to quickly access needed information without having to undergo the time consuming process of resizing or rearranging desktop window configurations.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for viewing a hidden window comprising the steps of:
    (a) identifying a primary application window, wherein the primary application window covers a second window;
    (b) continuously varying the degree of transparency of the primary application window based upon a first user interaction; and
    (c) ceasing the transparency variation based upon a second user interaction, whereby information contained in the second window becomes visible wherein the degree of transparency of the primary application window depends upon the elapsed time between the first user interaction and the second user interaction.

2. The method of claim 1 further including the step of:
    (d) returning the primary application window to an opaque state based upon a third user interaction.

3. The method of claim 1 wherein the first user interaction includes depressing a transparency button.

4. The method of claim 3 wherein the second user interaction includes releasing the transparency button.

5. The method of claim 1 wherein only the background of the primary application window varies in degree of transparency.

6. The method of claim 1 wherein the primary application window partially covers the second window.

7. A method of varying the transparency of a graphic object on a computer display comprising the steps of:
   (a) identifying a graphic object selected by a user interaction;
   (b) continuously varying the degree of transparency of the object based upon a first user interaction; and
   (c) ceasing the transparency variation based upon a second user interaction wherein the degree of transparency of the object depends upon the elapsed time between the first user interaction and the second user interaction.

8. The method of claim 7 further including the step of:
   (d) returning the transparent graphic object to an opaque state based upon a third user interaction.

9. The method of claim 7 wherein the first user interaction includes depressing a transparency button.

10. The method of claim 8 wherein the second user interaction includes releasing the transparency button.

11. A system for viewing a hidden window comprising:
   means for identifying a primary application window, wherein the primary application window covers a second window;
   means for continuously varying the degree of transparency of the primary application window based upon a first user interaction; and
   means for ceasing the transparency variation based upon a second user interaction, whereby information contained in the second window becomes visible, wherein the degree of transparency of the primary application window depends upon the elapsed time between the first user interaction and the second user interaction.

12. The system of claim 11 further including:
   means for returning the primary application window to an opaque state based upon a third user interaction.

13. The system of claim 11 wherein the first user interaction includes depressing a transparency button.

14. The system of claim 13 wherein the second user interaction includes releasing the transparency button.

15. The system of claim 11 wherein only the background of the primary application window varies in degree of transparency.

16. The system of claim 11 wherein the primary application window partially covers the second window.

17. A system of varying the transparency of a graphic object on a computer display comprising:
   means for identifying a graphic object selected by a user interaction;
   means for continuously varying the degree of transparency of the object based upon a first user interaction; and
   means for ceasing the transparency variation based upon a second user interaction wherein the degree of transparency of the object depends upon the elapsed time between the first user interaction and the second user interaction.

18. The system of claim 17 further including the step of:
   means for returning the transparent graphic object to an opaque state based upon a third user interaction.

19. The system of claim 17 wherein the first user interaction includes depressing a transparency button.

20. The system of claim 18 wherein the second user interaction includes releasing the transparency button.

21. A computer readable medium containing program instructions for viewing a hidden window, the program instructions comprising the steps of:
   (a) identifying a primary application window, wherein the primary application window covers a second window;
   (b) continuously varying the degree of transparency of the primary application window based upon a first user interaction; and
   (c) ceasing the transparency variation based upon a second user interaction, whereby information contained in the second window becomes visible, wherein the degree of transparency of the primary application window depends upon the elapsed time between the first user interaction and the second user interaction.

22. The computer readable medium of claim 21 further including the step of:
   (d) returning the primary application window to an opaque state based upon a third user interaction.

23. The computer readable medium of claim 21 wherein the first user interaction includes depressing a transparency button.

24. The computer readable medium of claim 23 wherein the second user interaction includes releasing the transparency button.

25. The computer readable medium of claim 21 wherein only the background of the primary application window varies in degree of transparency.

26. The computer readable medium of claim 21 wherein the primary application window partially covers the second window.

27. A computer readable medium containing program instructions for varying the transparency of a graphic object on a computer display, the program instructions comprising the steps of:
   (a) identifying a graphic object selected by a user interaction;
   (b) continuously varying the degree of transparency of the object based upon a first user interaction; and
   (c) ceasing the transparency variation based upon a second user interaction wherein the degree of transparency of the object depends upon the elapsed time between the first user interaction and the second user interaction.

28. The computer readable medium of claim 27 further including the step of:
   (d) returning the transparent graphic object to an opaque state based upon a third user interaction.

29. The computer readable medium of claim 27 wherein the first user interaction includes depressing a transparency button.

30. The computer readable medium of claim 28 wherein the second user interaction includes releasing the transparency button.

* * * * *